(12) United States Patent
Van Tilburg et al.

(10) Patent No.: US 11,015,684 B2
(45) Date of Patent: May 25, 2021

(54) CONTINUOUSLY VARIABLE TRANSMISSION AND VEHICLE PROVIDED WITH SUCH A TRANSMISSION

(71) Applicant: DRIVE TECHNOLOGY HOLLAND LTD., Best (NL)

(72) Inventors: Marinus Johannes Cornelis Van Tilburg, Best (NL); Henricus Josephus Maria Essens, Best (NL); Johannes Constant Maria De Wijs, Best (NL); Hubertus Hendrikes Adrianus Van Kasteren, Best (NL)

(73) Assignee: Drive Technology Holland Ltd. (NL/NL), Best (NL)

( * ) Notice: Subject to any disclaimer, the term of this patent is extended or adjusted under 35 U.S.C. 154(b) by 410 days.

(21) Appl. No.: 16/084,768

(22) PCT Filed: Mar. 15, 2017

(86) PCT No.: PCT/NL2017/050161
§ 371 (c)(1),
(2) Date: Sep. 13, 2018

(87) PCT Pub. No.: WO2017/160145
PCT Pub. Date: Sep. 21, 2017

(65) Prior Publication Data
US 2019/0072160 A1    Mar. 7, 2019

(30) Foreign Application Priority Data

Mar. 18, 2016 (NL) ..................... 2016453

(51) Int. Cl.
*F16H 9/12*    (2006.01)
*F16H 9/20*    (2006.01)
(Continued)

(52) U.S. Cl.
CPC ............... *F16H 9/125* (2013.01); *F16H 9/12* (2013.01); *F16H 9/20* (2013.01); *F16H 9/16* (2013.01); *F16H 55/49* (2013.01); *F16H 55/56* (2013.01)

(58) Field of Classification Search
CPC ..... F16H 9/00; F16H 9/04; F16H 9/12; F16H 9/125; F16H 9/14; F16H 9/16; F16H 9/18;
(Continued)

(56) References Cited

U.S. PATENT DOCUMENTS 2,198,747 A * 4/1940 Stobb ........................ F16H 9/14
                                                        474/43
3,757,594 A * 9/1973 Kumm .................... F16H 9/125
                                                        474/28
(Continued)

FOREIGN PATENT DOCUMENTS

JP    S5676755 A    6/1981
JP    S5680551 A    7/1981
(Continued)

OTHER PUBLICATIONS

JPS6362950A Translation; Miyawaki, M; A Belt-Type Continuously Variable Transmission; Published: Mar. 19, 1988; Espacenet (Year: 1988).*
(Continued)

*Primary Examiner* — Michael R Mansen
*Assistant Examiner* — Raveen J Dias
(74) *Attorney, Agent, or Firm* — Suiter Swantz pc llo

(57) ABSTRACT

A continuously variable transmission including a first pulley means, a second pulley means and an elongate, flexible endless transmission element that is passed over both the first pulley means and the second pulley means, wherein the first pulley means include two sheaves which are adjustable (Continued)

in an axial direction of the first rotation axis line, and an adjusting means for moving the two adjustable sheaves toward and away from each other in the axial direction for setting an operative radius of the first pulley means at which the transmission element is passed over the first pulley means, wherein the first pulley means is provided with alignment means for causing the two movable sheaves to jointly move additionally in the axial direction of the first rotation axis under the influence of a force exerted in axial direction on the first pulley means by the transmission element while maintaining the operative radius.

16 Claims, 4 Drawing Sheets

(51) Int. Cl.
    *F16H 9/16*     (2006.01)
    *F16H 55/49*     (2006.01)
    *F16H 55/56*     (2006.01)

(58) Field of Classification Search
    CPC ............. F16H 9/20; F16H 2009/163; F16H 2009/166; F16H 55/49; F16H 55/56; F16H 55/563; F16H 55/566; F16H 6/06; F16H 63/065; F16H 61/66263; F16H 2061/66295
    USPC ..................... 474/24, 25, 28, 30, 8
    See application file for complete search history.

(56) References Cited

U.S. PATENT DOCUMENTS

| | | | |
|---|---|---|---|
| 4,075,902 A * | 2/1978 | Charchian | F16H 55/56 403/358 |
| 4,149,425 A * | 4/1979 | Williams | F16H 55/56 384/417 |
| 4,674,994 A * | 6/1987 | Tomiyori | F16H 9/20 474/24 |
| 5,173,084 A | 12/1992 | Lemieux | |
| 5,766,105 A * | 6/1998 | Fellows | F16H 61/6625 474/18 |
| 6,270,436 B1 * | 8/2001 | Reik | F16H 9/14 474/15 |
| 2001/0019975 A1 * | 9/2001 | Uota | F16H 55/56 474/17 |
| 2004/0248678 A1 * | 12/2004 | Kapaan | F16H 63/067 474/8 |
| 2011/0207565 A1 * | 8/2011 | Ileogben | G01B 11/26 474/8 |
| 2015/0122557 A1 * | 5/2015 | Fairhead | B62M 27/02 180/6.7 |
| 2016/0339957 A1 * | 11/2016 | Watling | F16H 25/2204 |
| 2018/0128347 A1 * | 5/2018 | Chuptys | F16H 9/20 |

FOREIGN PATENT DOCUMENTS

| | | |
|---|---|---|
| JP | S6362950 A | 3/1988 |
| JP | 2014194263 A | 10/2014 |
| JP | 2015007462 A | 1/2015 |
| NL | 7611001 A | 4/1978 |
| NL | 1019204 C2 | 4/2003 |

OTHER PUBLICATIONS

International Search Report for International Application No. PCT/NL2017/050161 dated Jun. 13, 2017.

* cited by examiner

CONTINUOUSLY VARIABLE TRANSMISSION AND VEHICLE PROVIDED WITH SUCH A TRANSMISSION

TECHNICAL FIELD AND BACKGROUND

The present invention relates to a continuously variable transmission comprising a first pulley means, which is rotatable about a first rotation axis line, a second pulley means, which is rotatable about a second rotation axis line, and an elongate, flexible endless transmission element that is passed over both the first pulley means and the second pulley means, wherein the first pulley means comprises two sheaves, which are adjustable in an axial direction of the first rotation axis line, and an adjusting means, which adjusting means is configured to move the two adjustable sheaves toward and away from each other in the axial direction of the first rotation axis line for setting an operative radius of the first pulley means at which the transmission element is passed over the first pulley means.

With such a transmission, a driving force can be transmitted via the first pulley means, the transmission element and the second pulley means, or vice versa. The transmission ratio is infinitely adjustable.

According to a second aspect the invention relates to a machine such as, preferably, a vehicle, but alternatively a windmill or an industrial machine, such as a material working machine provided with a continuously variable transmission according to the first aspect.

EP 0 713 822 and U.S. Pat. No. 4,674,994 both disclose a known continuously variable transmission comprising two pulley means, over which a belt is passed. In these transmissions, use is made of axially movable sheaves, by which the operative diameter of the belt on a pulley means is increased or decreased by moving the sheaves. A drawback of said known transmissions is the need for a relatively precise construction to make it possible to reduce wear of the transmission, in particular the belt, in use.

BRIEF SUMMARY

Accordingly it is an object of the present invention to provide a continuously variable transmission by which relatively low wear of the transmission can be realised in an effective manner.

The above object is achieved with the continuously variable transmission according to the present invention, wherein the first pulley means is provided with alignment means for causing the two movable sheaves to jointly move additionally in the axial direction of the first rotation axis under the influence of a force exerted in axial direction on the first pulley means by the transmission element whilst maintaining the operative radius.

The present invention is at least in part based on the insight that in the case of the known transmissions a relatively precise construction, such as a housing of the transmission or a frame on which the pulley means are mounted, is needed to maintain a sufficient degree of alignment of the transmission element with the pulley means so as to thus reduce wear of the transmission element and the pulley means in use. Because the continuously variable transmission according to the present invention is provided with alignment means as mentioned above, it is possible to maintain a desired alignment not only during assembly but also in use, and that to a high degree independently of the construction precision.

An additional advantage is that by jointly moving the two movable sheaves additionally in the axial direction of the first rotation axis under the influence of a force exerted in axial direction on the first pulley means by the elongate, flexible endless transmission element in use whilst maintaining the operative radius, a continued high degree of alignment between the transmission element and the pulley means is realised with a relatively large transmission range also in the case of possible movement in axial direction of the transmission element that is passed over the first pulley means, making it possible to transfer the driving force. The transferable driving force is maintained as a result of a relatively good alignment, because a transmission element makes good contact with the first pulley means.

Within the framework of the present invention, the term "transmission range" is understood to mean the range from the smallest possible transmission ratio to the greatest possible transmission ratio of the transmission.

Within the framework of the present invention, the term "sheave" is understood to mean a disc, or pulley, which extends radially to a rotation axis line and which is configured to cooperate in use with a transmission element, for example in the form of a belt or a chain. An example of such a transmission element is a push belt, wherein the sheaves are conical in shape. Alternatively, pulley means may be provided with radially movable contact blocks between the two sheaves, with which the transmission element, for example in the form of a toothed belt, is in contact.

It is advantageous if the alignment means is configured to move the adjusting means and the two movable sheaves jointly in axial direction against a spring force from a spring means that forms part of the alignment means. This makes it possible to obtain a direct connection between the movable sheaves and the adjusting means for obtaining a reliable adjustment of the sheaves. In one embodiment, the alignment means is configured to cause the adjusting means and the two movable sheaves to move in axial direction against a damping force from a damping means that forms part of the alignment means in and/or against a combined spring force from a spring means and a damping force from a damping means that form part of the alignment means. The damping means may be a hydraulic damper, for example.

In a practical embodiment, the spring means comprises a first spring and a second spring, wherein a first sheave of the two sheaves is held under spring tension against the first spring and a second sheave of the two sheaves is held under spring tension against the second spring, which acts in the opposite direction of the first spring. The provision of springs in this way is advantageous for forcing the two movable sheaves to a desired axial position with a relatively small force component in axial direction of the force exerted on the first pulley means by the transmission element in use whilst maintaining the operative radius.

It is advantageous in this regard if the first spring and the second spring are provided in a shaft on which the two movable sheaves are mounted. This makes it possible to realise a relatively compact construction.

It is preferable if the spring constant of the first spring and that of the second spring are at least substantially the same. This makes it possible to force to a desired axial position from opposite positions relative to the desired axial positions, parallel to the first rotation axis, using a substantially even force.

In a practical embodiment, the adjusting means forces the two movable sheaves toward each other in use. In this way a running radius can be determined in an advantageous manner.

It is advantageous if the adjusting means comprises a pressure chamber for determining the operative radius of the first pulley means in dependence on a pressure generated in the pressure chamber by a pressure medium, preferably a fluid. This makes it possible to realise a relatively high force for determining the operative radius while using a relatively simple construction.

The pressure medium is preferably a fluid, preferably an oil, but in an alternative embodiment another suitable fluid or a gas, such as air, may be used.

It is advantageous in that case if the adjusting means is configured so that the two movable sheaves are forced toward each other when the pressure in the pressure chamber increases.

The pressure chamber is preferably provided concentrically relative to a shaft on which the two movable sheaves are mounted, the central axis of which shaft is the first rotation axis, wherein the shaft is rotatable relative to the pressure chamber. In this way a compact construction of the first pulley means can be realised. The pressure chamber, and thus the pressure medium present in the pressure chamber, thus does not rotate, or at least only to a small extent. Possible effects of centrifugal force on the medium are thus absent or at least highly limited.

It is advantageous in that regard if the pressure chamber is provided in an at least partially hollow cylinder body, wherein bearings are provided for rotatably supporting the hollow cylinder body on the shaft on which the two movable sheaves are mounted.

It is advantageous if the pressure chamber is provided with an inlet opening for admitting and discharging the pressure medium into and from the pressure chamber. The pressure prevailing in the pressure chamber can thus be changed, making it possible to adjust the operative radius of the first pulley means.

It is advantageous if a first piston body and a second piston body are provided in an annulus between the shaft on which the sheaves are mounted and the cylinder body, wherein the first piston body is connected to a first movable sheave of the two movable sheaves and the second piston body is connected to a second movable sheave of the two movable sheaves.

In a very practical embodiment, the transmission comprises a shaft on which the two movable sheaves are mounted, the central axis of which shaft is the first rotation axis, wherein, in one embodiment, the shaft is a crankshaft configured to have a crank mounted thereon. This is advantageous for driving the first transmission element by means of a crank, as is for example the case with a cycle-type vehicle.

In one embodiment, the second pulley means is identical to the first pulley means. The transmission is in that case configured to move the two sheaves of the second pulley means toward each other, using the adjusting means of the second pulley means, when the two sheaves of the first pulley means are moved apart in the axial direction by the adjusting means of the first pulley means. Or in other words, the operative radius of the transmission element on the second pulley means increases when the operative radius of the transmission element on the first pulley means decreases.

In an alternative embodiment, the second pulley means provides a fixed operative radius. The second pulley means may in that case be a gear or a sprocket wheel. The transmission may in that case comprise a tensioner, such as a tensioning wheel that acts on the transmission element between the first and the second pulley means, for maintaining a tension on the transmission element so as to ensure that contact between the transmission element and the first and second pulley means is maintained.

In one embodiment, the alignment means may be configured to cause the two sheaves to move jointly in axial direction relative to a frame in which the first pulley means and the second pulley means are mounted at a mutual distance.

According to the second aspect, the invention relates to a vehicle, for example a cycle, such as a bicycle or a moped, provided with a continuously variable transmission according to the first aspect of the present invention. The advantages of such a vehicle are analogous to the advantages of the transmission.

In an advantageous embodiment of a vehicle according to the present invention, in which the pressure chamber is provided in an at least partially hollow cylinder body, with bearings being provided for rotatably supporting the hollow cylinder body on the shaft on which the two movable sheaves are mounted, it is advantageous if the vehicle is a cycle and the hollow cylinder body is formed by at least part of the frame of the cycle.

It is advantageous in that regard if the pressure chamber is provided with an inlet opening for admitting and discharging the pressure medium, for example oil, into and from the pressure chamber, and if the cycle comprises a control device connected to the inlet opening for determining a transmission ratio by means of the controlled admission and discharge of the pressure medium into and from the pressure chamber. Such a control device is advantageous for adjusting a transmission ratio in a practical manner.

The vehicle preferably comprises a frame, such as a chassis in the case of a vehicle of the motor vehicle type, or a cycle frame, wherein the transmission comprises a housing fixed to the frame, wherein the first pulley means and the second pulley means are mounted at a mutual distance in the housing, wherein the shaft of the first pulley means is rigidly connected to the housing for movement in axial direction, wherein the alignment means is configured to cause the two sheaves to move jointly in axial direction relative to the shaft in use.

BRIEF DESCRIPTION OF THE DRAWINGS

The present invention will now be explained in more detail by means of a description of a preferred embodiment of a first pulley means of a continuously variable transmission and a continuously variable transmission according to the present invention, in which reference is made to the following schematic figures, in which.

DETAILED DESCRIPTION

Figure 1:
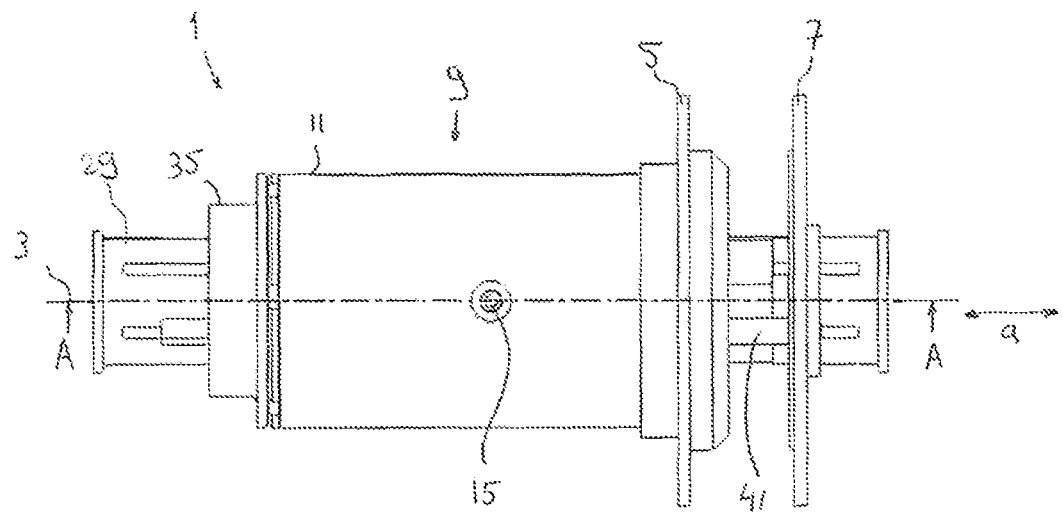
FIG. 1 shows a first pulley means according to the present invention in a first operative position thereof.
Figure 2:
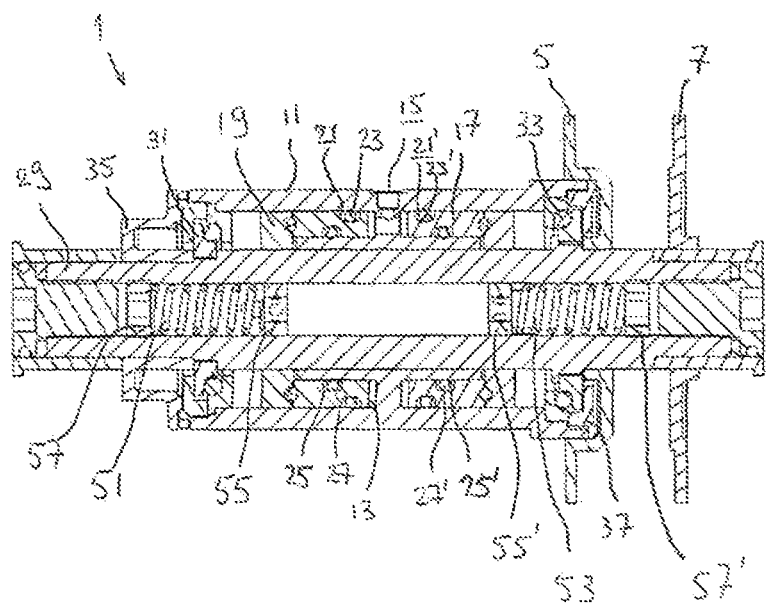
FIG. 2 is a sectional view A-A of the first pulley means of FIG. 1.
Figure 3:
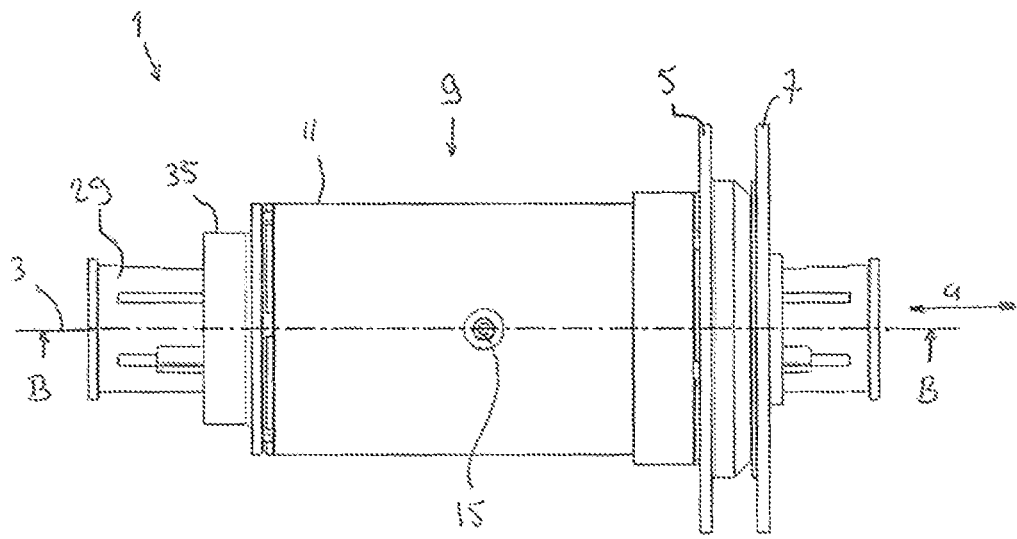
FIG. 3 shows the first pulley means of FIG. 1 in a second operative position thereof.
Figure 4:
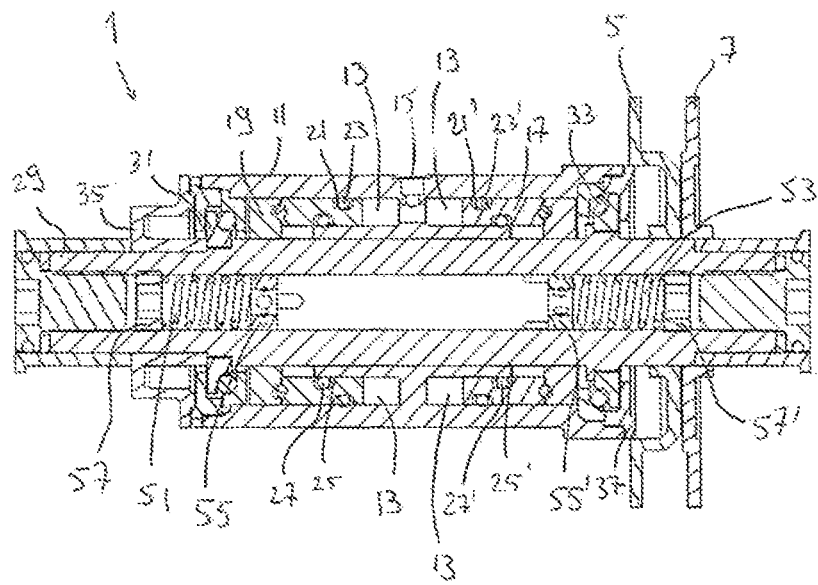
FIG. 4 is a sectional view B-B of the first pulley means of FIG. 3.
Figure 5:
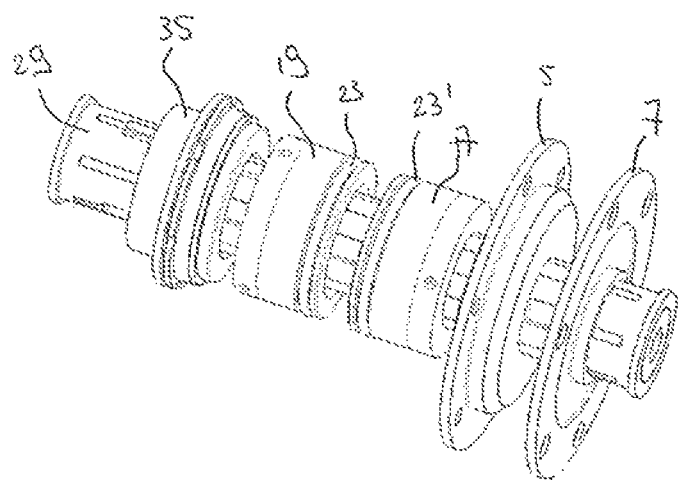
FIG. 5 shows an assembly of parts of the first pulley means of FIG. 1.
Figure 6:
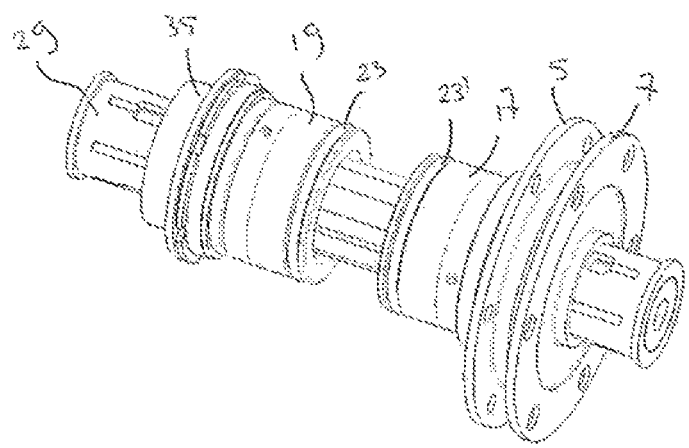
FIG. 6 shows an assembly of parts of the first pulley means of FIG. 4.
Figure 7:
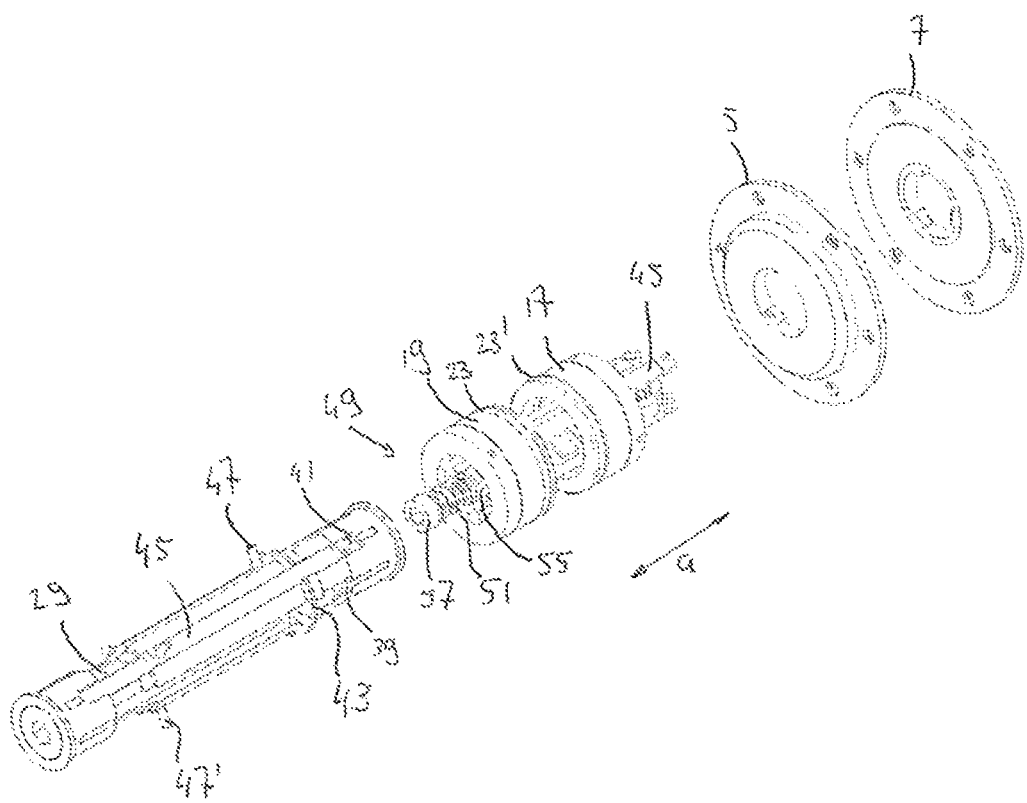
FIG. 7 is an exploded view of the parts shown in FIGS. 5 and 6.

The first pulley means 1, which is rotatable about a first rotation axis line 3, comprises a first sheave 5 and a second sheave 7, or at least parts thereof that are connected to an adjusting means 9, which can be moved in the axial direction a of the first rotation axis line 3 by the adjusting means 9. Further sheave parts extending in radial direction may be mounted to the parts of the sheaves 5 and 7, depending on the transmission element 106 (see FIG. 8) that is used. Conical sheaves may be considered in this connection, for example. The sheave parts indicated in the figures will hereinafter be referred to as sheaves 5 and 7. The sheaves 5 and 7 are locked against movement in the direction of rotation on the shaft 29 whilst being movable in the axial direction a. The central axis of the shaft 29 coincides with the rotation axis line 3. By moving the first sheave 5 and the second sheave 7 in opposite axial direction a, an operative radius of the first pulley means 1 at which ah elongate flexible endless transmission element (shown only in FIG. 8) is passed over the first pulley means 1 can be determined.

The adjusting means 9 comprises an at least partially hollow cylinder body 11, which extends concentrically about the first rotation axis line 3 of the shaft 29. Provided within the hollow cylinder body 11 is a pressure chamber 13, which extends between the shaft 29 and the cylinder body 11. Provided in the hollow cylinder body 11 is an inlet opening 15 for admitting and discharging a pressure medium, for example a fluid such as oil, into and from the pressure chamber 13. The pressure chamber 13 is bounded axially on opposite sides by a first piston body 17 and a second piston body 19, which first piston body 17 is connected to the first sheave 5 and which second piston body 19 is connected to the second sheave 7. The first piston body 17 and the second piston body 19 are provided with an outer groove 21, 21', respectively, in an outer circumferential wall, in which an outer sealing ring 23, 23' is provided for sealing the pressure chamber from the cylinder body 11 on the outer circumferential wall of the first piston body 17 and the second piston body 19, respectively. The first piston body 17 and the second piston body 19 are provided with an inner groove 25, 25', respectively, in an inner circumferential wall, in which an inner sealing ring 27, 27' is provided for sealing the pressure chamber 13 from the cylinder body 11 on the inner circumferential wall of the first piston body 17 and the second piston body 19, respectively.

The hollow cylinder body 11 is supported on a first bearing 31 and a second bearing 33 near its ends so as to make rotation of the shaft 29 relative to the hollow cylinder body 11 possible. On the side of the first bearing 31 remote from the first piston body 17, a first retaining body 35 is provided for retaining the first bearing 31 in the hollow cylinder body 11. A second retaining body 37 is provided on the side of the second bearing 33 remote from the second piston body 19 for retaining the second bearing 33 in the hollow cylinder body 11.

The shaft 29 is provided with first slots 39 and second slots 41, which extend in the axial direction a of the rotation axis line 3. In the first slots 39 and the second slots 41, a first connecting means 43 and a second connecting means 45, respectively, are mounted for axial movement therein. The first connecting means 43 and the second connecting means 45 are provided with connecting elements 47, 47' in the form of radial pins for interconnecting the first connecting means 43 and the first piston body 17 and interconnecting the second connecting means 45 and the second piston body 19. The first sheave 5 and the second sheave 7 are connected to the first connecting means 43 and the second connecting means 45, respectively, so that a movement in axial direction a of a respective connecting means imparted by the first piston body 17 and the second piston body 19 will lead to simultaneous movement in axial direction a of a respective sheave 5, 7.

The pulley means 1 is further provided with an alignment means 49 for causing the two movable sheaves 5 and 7 to additionally move jointly in the axial direction a of the first rotation axis line 3 in dependence on a force exerted on the first pulley means 1 by the elongate, flexible endless transmission element in use whilst maintaining the operative radius. The alignment means 49 to that end comprises a spring means comprising a first spring 51 and a second spring 53. The first spring 51 bears against a first support element 57 on a side remote from the first spring 51, seen in the axial direction a, and against a second support element 55, which is connected to the second connecting element 45, on a side facing the first spring 51, seen in axial direction. The second spring 53 bears against a further first support element 57' on a side remote from the second spring 53, seen in the axial direction a, and against a further second support element 55' on a side facing the second spring 53, seen in the axial direction a. The further second support element 55' is connected to the first connecting element 43. The spring constant of the first spring 51 and that of the second spring 53 are at least substantially the same so as to obtain a comparable alignment effect in both axial directions a. Alternatively, or in combination with the aforesaid springs 51, 53, a damping means such as a hydraulic damper may be provided.

By admitting fluid into the pressure chamber 13 via the inlet opening 15, the first piston body 17 and the second piston body 19 are moved away from each other in the axial direction a. As a result of the connection of the first piston body 17 to the first sheave 5 via the first connecting element 43, the first sheave 5 is forced in the direction of the second sheave 7. The second sheave 7 is forced toward the first sheave 5 by movement of the second piston body 19 caused by the admission of fluid into the pressure chamber 13. If an adjusted pressure is maintained in the pressure chamber 13, or rather if a volume of the fluid, oil in the present example, in the pressure chamber 13 is kept constant, the two movable sheaves 5 and 7 can additionally be moved in the axial direction a of the first rotation axis line 3 whilst the spacing between the two, or in other words the operative radius, is maintained against the spring action of the first spring 51 and the second spring 53.

Figure 8:
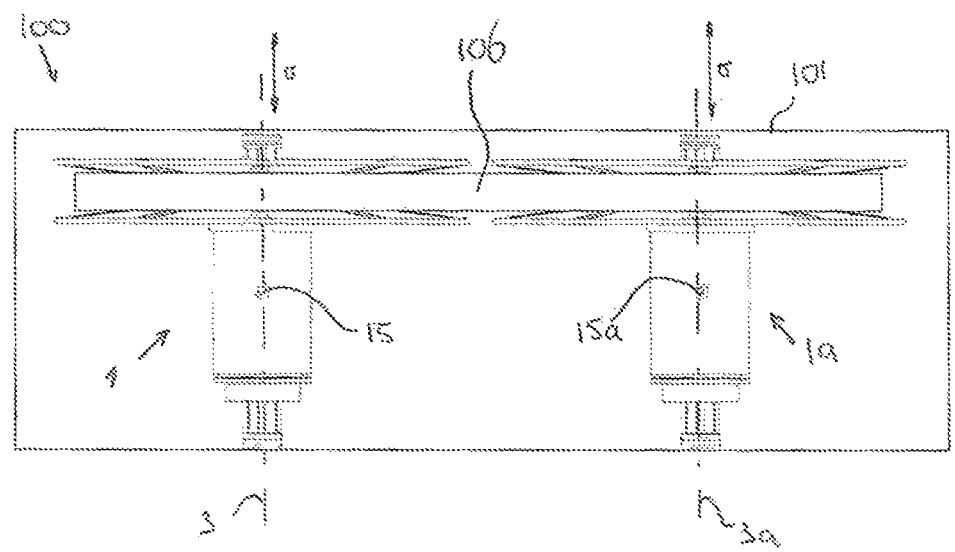
FIG. 8 shows a preferred embodiment of a continuously variable transmission according to the present invention.

The continuously variable transmission 100 that is shown in FIG. 8 is provided with a housing 101, a first pulley means 1 as described above, which is rotatable about a first rotation axis line 3, and a second pulley means 1a, identical to the pulley means 1, which is rotatable about a rotation axis line 3a. An elongate, flexible endless transmission element 106 is passed over the first pulley means 1 and the second pulley means 1a. In the example shown in FIG. 8, the sheaves are conical in shape, and the transmission element 106 is a V-belt. By introducing oil into the pressure chambers associated with the inlet openings 15 and 15a or removing oil therefrom via said inlet openings, the two sheaves of each pulley means can be forced apart or toward each other, thus making it possible to adjust the operative radius of the V-belt on both pulley means.

The invention claimed is:

1. A continuously variable transmission comprising a first pulley means, which is rotatable about a first rotation axis line, a second pulley means, which is rotatable about a second rotation axis line, and an elongate, flexible endless transmission element that is passed over both the first pulley means and the second pulley means, wherein the first pulley means comprises two movable sheaves, which are adjustable in an axial direction of the first rotation axis line, and an adjusting means configured to move the two movable sheaves toward and away from each other in the axial direction of the first rotation axis line for setting an operative radius of the first pulley means at which the transmission element is passed over the first pulley means, wherein the first pulley means is provided with an alignment means for causing the two movable sheaves to jointly move additionally in the axial direction of the first rotation axis line under the influence of a force exerted in the axial direction on the first pulley means by the transmission element while maintaining the operative radius;

wherein the alignment means is configured to move the adjusting means and the two movable sheaves jointly in the axial direction against a spring force from a spring means that forms part of the alignment means; and wherein the spring means comprises a first spring and a second spring, wherein a first movable sheave of the two movable sheaves is held under spring tension against the first spring and a second movable sheave of the two movable sheaves is held under spring tension against the second spring, which acts in an opposite direction of the first spring.

2. The continuously variable transmission according to claim 1, wherein the first spring and the second spring are provided in a shaft on which the two movable sheaves are mounted.

3. The continuously variable transmission according to claim 1, wherein a spring constant of the first spring and a spring constant of the second spring are at least substantially the same.

4. The continuously variable transmission according to claim 1, wherein the adjusting means forces the two movable sheaves toward each other in use.

5. The continuously variable transmission according to claim 1, wherein the adjusting means comprises a pressure chamber for determining the operative radius of the first pulley means in dependence on a pressure generated in the pressure chamber by a pressure medium.

6. The continuously variable transmission according to claim 5, wherein the adjusting means is configured so that the two movable sheaves are forced toward each other when the pressure in the pressure chamber increases.

7. The continuously variable transmission according to claim 5, wherein the pressure chamber is provided concentrically relative to a shaft on which the two movable sheaves are mounted, a central axis of the shaft is the first rotation axis line, wherein the shaft is rotatable relative to the pressure chamber.

8. The continuously variable transmission according to claim 7, wherein the pressure chamber is provided in an at least partially hollow cylinder body, wherein bearings are provided for rotatably supporting the at least partially hollow cylinder body on the shaft on which the two movable sheaves are mounted.

9. The continuously variable transmission according to claim 5, wherein the pressure chamber is provided with an inlet opening for admitting and discharging the pressure medium into and from the pressure chamber.

10. The continuously variable transmission according to claim 5, wherein a first piston body and a second piston body are provided in an annulus between a shaft on which the two movable sheaves are mounted, wherein the first piston body is connected to the first movable sheave of the two movable sheaves and the second piston body is connected to the second movable sheave of the two movable sheaves.

11. The continuously variable transmission according to claim 1, further comprising a shaft on which the two movable sheaves are mounted, wherein a central axis of the shaft is the first rotation axis line, and wherein the shaft is a crankshaft configured to have a crank mounted thereon.

12. The continuously variable transmission according to claim 1, wherein the alignment means are configured to cause the two movable sheaves to move jointly in the axial direction relative to a frame in which the first pulley means and the second pulley means are mounted at a mutual distance.

13. A vehicle having a continuously variable transmission comprising a first pulley means rotatable about a first rotation axis line, a second pulley means rotatable about a second rotation axis line, and an elongate, flexible endless transmission element passing over both the first pulley means and the second pulley means, wherein the first pulley means comprises two movable sheaves that are adjustable in an axial direction of the first rotation axis line, and an adjusting means configured to move the two movable sheaves toward and away from each other in the axial direction of the first rotation axis line for setting an operative radius of the first pulley means at which the transmission element is passed over the first pulley means, wherein the first pulley means is provided with an alignment means for causing the two movable sheaves to jointly move additionally in the axial direction of the first rotation axis line under the influence of a force exerted in the axial direction on the first pulley means by the transmission element while maintaining the operative radius;

wherein the alignment means is configured to move the adjusting means and the two movable sheaves jointly in the axial direction against a spring force from a spring means that forms part of the alignment means; and wherein the spring means comprises a first spring and a second spring, wherein a first movable sheave of the two movable sheaves is held under spring tension against the first spring and a second movable sheave of the two movable sheaves is held under spring tension against the second spring, which acts in an opposite direction of the first spring.

14. The vehicle according to claim 13, wherein the adjusting means comprises a pressure chamber for determining the operative radius of the first pulley means in dependence on a pressure generated in the pressure chamber by a pressure medium, wherein the pressure chamber is provided concentrically relative to a shaft on which the two movable sheaves are mounted, a central axis of the shaft is the first rotation axis line, wherein the shaft is rotatable relative to the pressure chamber, wherein the pressure chamber is provided in an at least partially hollow cylinder body, wherein bearings are provided for rotatably supporting the at least partially hollow cylinder body on the shaft on which the two movable sheaves are mounted, and wherein the vehicle is a cycle and the at least partially hollow cylinder body is formed by at least part of a frame of the cycle.

15. The vehicle according to claim 14, wherein the pressure chamber is provided with an inlet opening for admitting and discharging the pressure medium into and from the pressure chamber.

16. The vehicle according to claim 13, further comprising a frame, wherein the continuously variable transmission comprises a housing fixed to the frame, wherein the first pulley means and the second pulley means are mounted at a mutual distance in the housing, wherein a shaft of the first pulley means is rigidly connected to the housing for movement in the axial direction, and wherein the alignment means is configured to cause the two movable sheaves to move jointly in the axial direction relative to the shaft in use.

* * * * *